Nov. 19, 1929.  W. R. SOMMER  1,736,379
WIRE CONNECTER
Original Filed April 1, 1925
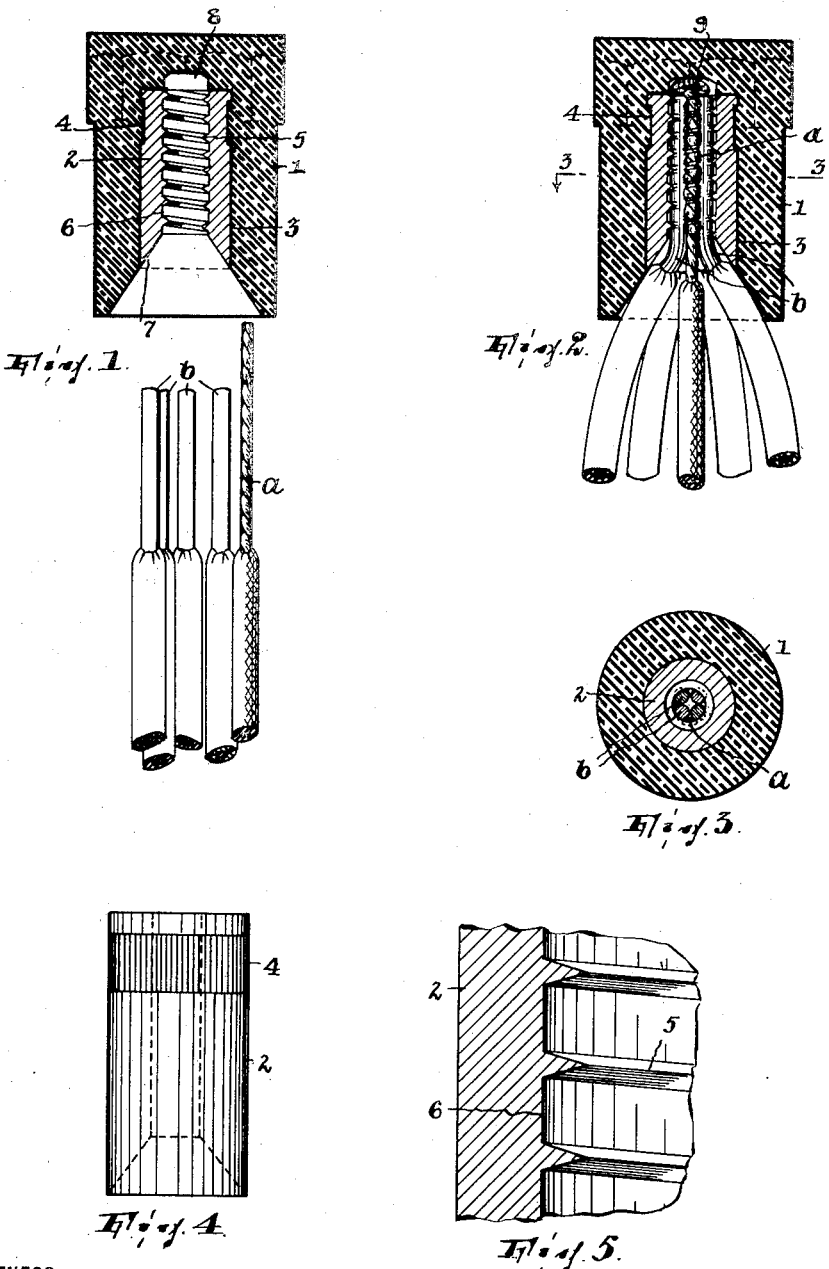
WITNESS
INVENTOR,
William R. Sommer,
BY
ATTORNEY Patented Nov. 19, 1929

1,736,379

UNITED STATES PATENT OFFICE

WILLIAM R. SOMMER, OF HACKENSACK, NEW JERSEY, ASSIGNOR TO THE JIFFY WIRE CONNECTOR COMPANY, OF HACKENSACK, NEW JERSEY, A CORPORATION OF NEW JERSEY

WIRE CONNECTER

Refiled for abandoned application Serial No. 19,925, filed April 1, 1925. This application filed October 26, 1926. Serial No. 144,322.

This invention relates to the class of devices for forming an electro-conductive joint between two or more wires which are characterized by an insulative shell having a bore and a metal sleeve within the bore having its own bore formed with a screw-thread so that when the wires, lying side by side, are forced into the sleeve and turned in the proper direction the screw-thread will cut in effect a mating screw-thread in the wires, producing a screw-joint between the device and each wire. It is of course important in these devices that the joint established should be such that any wire should be incapable of being pulled out; on the other hand, it is desirable that little effort and that only of the bare hands should be required in order to force the wires screw-fashion into the device. Both of these desiderata have not been present in previous devices of this class; if the joint has reliably prevented the pulling out of the wires then the force required to form it was beyond the hand-grip capacity of the workman, and if the conditions have been such that any person having a fair grip could force in the wires to the limit then the joint was so weak that the wires could be pulled out. One object of this invention is to provide a device of this class in which a perfectly effective joint may be established and yet no unusual effort is required on the part of the operator to form the joint. I accomplish this object by substituting for the thread-cutting sleeve heretofore used and of conventional form a thread-cutting sleeve of special type.

Other objects and certain advantageous features of the invention will be hereinafter set forth in connection with the detailed description of the improved device and the manner in which it is used.

In the drawing,

Fig. 1 is a longitudinal central sectional view of the device, showing the wires about to be entered;

Fig. 2 is a similar section, with the wires in place and the joint perfected, the wires appearing in side elevation;

Fig. 3 is a section on line 3—3 in Fig. 2;

Fig. 4 is an enlarged side elevation of the thread-cutting sleeve; and

Fig. 5 a fragmentary longitudinal section thereof.

1 designates a generally cylindrical shell of insulating material having one end closed. 2 is the thread-cutting metal sleeve encased in the same or occupying its bore 3. In forming the device the shell is molded on the sleeve by a suitable method not herein material, any possibility of the shell twisting loose from the sleeve being prevented by exterior knurling 4 formed on the sleeve so that in the molding the sleeve and shell will become firmly locked together.

The sleeve for subserving its function as a thread-cutter thus to establish the joint to be formed is provided interiorly with a spiral cutting element 5 which is V-shaped in cross-section but whose volutes are spaced from each other. That is to say, instead of the inclined side of any one volute meeting the inclined side of the next adjoining volute (as the sleeve is seen in longitudinal section in Fig. 5) to form a V, such two sides are spaced from each other at the bases of the two volutes, the intervening surface 6 being cylindrical. This form of sleeve is entirely unique. In previous devices of this class the V-shaped thread-cutting element had the volutes thereof directly adjoining each other. Therefore, whereas in that case it is either a matter of its being impossible by mere hand-grip to screw the wire ends fully home in the sleeve or, if such be possible, then of the joint being occasionally if not frequently so weak that a wire can be pulled out, in the former case the wires can be readily screwed fully home and when the joint is thus completed each wire is so firmly held that rupture thereof will invariably occur before the wire can be dislodged from the device by a pull thereon. In fact, if force is used sufficient to screw in the wires in the former device so as to obtain a holding of the wires equal to that possible with my device, in most instances the wires will be twisted and mutilated whereas in mine they will remain almost perfectly straight, thus demonstrating that the work of forming a screw-thread in and thus affording a proper anchorage for the wires by my device is not appreciably supplemented and hence obstructed by the work of overcoming friction and effecting compression. Again, taking the case where one of the wires is a stranded wire, whereas an effective holding of each wire can only be accomplished by badly distorting and sometimes disrupting a number of the strands of the stranded wire within the device when of the previous type, with my device an effective holding is accomplished without appreciable disturbance of or injury to the stranded wire on which wire the cutting element is effective only to slidingly indent or score such wire and not to incise, rupture or strain it.

In many instances the workman is positioned so that he cannot conveniently see to introduce the wires to the device; wherefore, and also to avoid twisting the wire ends together, I form its mouth 7, leading to the bore of its sleeve, flaring or tapered. So far as sleeve 2 is concerned, the smooth flared surface thus afforded, reaching quite to the adjoining end of the bore, affords a face for compacting together the extremities of the wires if they are stiff and planishing down any burrs left thereon by the wire-cutting tool and then inducting such ends into said bore and so into engagement with the thread-cutting element; and, so far as both shell and sleeve are concerned, since the inner or smaller diameter of the flare in the shell does not exceed that of the outer or larger diameter of the flare in the sleeve, the whole operation resolves itself into the simple and single one of screwing the wires into the device until they are "home" and locked in place by the thread-cutting element, which will be apparent by the sudden additional resistance then occurring.

When assembling a wire of yielding material, such as a stranded or "fixture" wire $a$, with other wires, as wires of harder material, like line wires $b$, I extend the end of the first wire beyond the ends of the others, as in Fig. 1, where all the wire ends are shown bared, ready to be introduced. Then when the group of wires are introduced into the device in the manner described the closed end of the bore of the device becomes in effect an anvil 8 by and upon which the projecting end of the yielding stranded wire becomes upset, bent into a knob-like mass 9, Fig. 2. This feature of my invention is not to be regarded as indispensably an adjunct of my specific joint forming-device, for given any joint-forming device into which the wires are screwed it will be apparent that with one wire formed in the device with a knob-like mass or head in this way the integrity of the joint formed will be very materially increased.

Having thus fully described my invention what I claim and desire to secure by Letters Patent is:

1. A device of the class described having a bore to receive the wires to be united and in the bore an inwardly projecting thread-cutting element the volutes of which are spaced from each other at their bases and each uninterrupted around the axis of said bore.

2. A device of the class described having a bore to receive the wires to be united and in the bore an inwardly projecting substantally V-shaped thread-cutting element the volutes of which are spaced from each other at their bases, and each uninterrupted around the axis of said bore.

3. A device of the class described including a shell of insulating material having a bore and a thread-forming member fixed in said bore and having a thread-forming bore substantially concentric with the first bore, said bores having a smooth conical mouth formed in said shell and member with the smaller diameter of that portion thereof which is in the shell not greater than the larger diameter of that portion thereof which is in said member, whereby said mouth will guide wire ends introduced thereto toward the thread-forming bore without obstruction and the portion thereof formed in said member will afford a planishing surface.

4. The method of uniting wires of which one is yielding which consists in placing the wires side by side with the end of the yielding wire projecting further than the ends of the other wire or wires, and thereupon screwing over all such ends a uniting device having a screw-threaded bore open at one end to receive such ends and having an abutment at the other, continuing such screwing until the projecting end portion of the yielding wire is upset upon the ends of the other wire or wires by said abutment.

5. A united wire assembly including a device having a threaded bore formed with one end open and with an abutment at the other, and a plurality of wires having their end portions received and gripped by the threading of said bore, the end of one such wire being upset and its upset portion being held between said abutment and the end portion or portions of the other wire or wires.

In testimony whereof I affix my signature.

WILLIAM R. SOMMER.